US010298950B2

(12) United States Patent
Wang et al.

(10) Patent No.: US 10,298,950 B2
(45) Date of Patent: *May 21, 2019

(54) P FRAME-BASED MULTI-HYPOTHESIS MOTION COMPENSATION METHOD

(71) Applicant: PEKING UNIVERSITY SHENZHEN GRADUATE SCHOOL, Shenzhen (CN)

(72) Inventors: Ronggang Wang, Shenzhen (CN); Lei Chen, Shenzhen (CN); Zhenyu Wang, Shenzhen (CN); Siwei Ma, Shenzhen (CN); Wen Gao, Shenzhen (CN); Tiejun Huang, Shenzhen (CN); Wenmin Wang, Shenzhen (CN); Shengfu Dong, Shenzhen (CN)

(73) Assignee: PEKING UNIVERSITY SHENZHEN GRADUATE SCHOOL, Shenzhen (CN)

(*) Notice: Subject to any disclaimer, the term of this patent is extended or adjusted under 35 U.S.C. 154(b) by 102 days.

This patent is subject to a terminal disclaimer.

(21) Appl. No.: 15/006,147

(22) Filed: Jan. 26, 2016

(65) Prior Publication Data
US 2016/0142728 A1    May 19, 2016

Related U.S. Application Data

(63) Continuation-in-part of application No. PCT/CN2013/080172, filed on Jul. 26, 2013.

(51) Int. Cl.
*H04N 19/51*    (2014.01)
*H04N 19/52*    (2014.01)
*H04N 19/55*    (2014.01)
*H04N 19/56*    (2014.01)
(Continued)

(52) U.S. Cl.
CPC ......... *H04N 19/513* (2014.11); *H04N 19/176* (2014.11); *H04N 19/51* (2014.11);
(Continued)

(58) Field of Classification Search
CPC .. H04N 19/577; H04N 19/513; H04N 19/521; H04N 19/533; H04N 19/56
See application file for complete search history.

(56) References Cited

U.S. PATENT DOCUMENTS 9,531,990 B1 * 12/2016 Wilkins .................. H04N 7/00
2003/0059119 A1 * 3/2003 Buschmann ........... H04N 19/51
382/236
(Continued)

FOREIGN PATENT DOCUMENTS

CN    101610413 A    12/2009
CN    102668562 A    9/2012

OTHER PUBLICATIONS

Int'l Bureau of WIPO, Int'l Preliminary Report on Patentability for PCT/CN2013/080172 (dated Jan. 26, 2016).*

*Primary Examiner* — David N Werner
(74) *Attorney, Agent, or Firm* — Matthias Scholl P.C.; Matthias Scholl (57) ABSTRACT

A P frame-based multi-hypothesis motion compensation method includes: taking an encoded image block adjacent to a current image block as a reference image block and obtaining a first motion vector of the current image block by using a motion vector of the reference image block, the first motion vector pointing to a first prediction block; taking the first motion vector as a reference value and performing joint motion estimation on the current image block to obtain a second motion vector of the current image block, the second motion vector pointing to a second prediction block; and performing weighted averaging on the first prediction block and the second prediction block to obtain a final prediction block of the current image block. The method increases the accuracy of the obtained prediction block of the current image block without increasing the code rate.

4 Claims, 6 Drawing Sheets

(51) Int. Cl.
*H04N 19/91* (2014.01)
*H04N 19/176* (2014.01)
*H04N 19/513* (2014.01)
*H04N 19/533* (2014.01)
*H04N 19/553* (2014.01)
*H04N 19/557* (2014.01)
*H04N 19/157* (2014.01)
*H04N 19/159* (2014.01)

(52) U.S. Cl.
CPC ........... *H04N 19/52* (2014.11); *H04N 19/533* (2014.11); *H04N 19/55* (2014.11); *H04N 19/553* (2014.11); *H04N 19/557* (2014.11); *H04N 19/56* (2014.11); *H04N 19/91* (2014.11); *H04N 19/157* (2014.11); *H04N 19/159* (2014.11)

(56) References Cited

U.S. PATENT DOCUMENTS

| | | | | |
|---|---|---|---|---|
| 2003/0142748 A1* | 7/2003 | Tourapis | ................ | H04N 19/56 375/240.13 |
| 2006/0280253 A1 | 12/2006 | Tourapis et al. | | |
| 2009/0257492 A1* | 10/2009 | Andersson | ........... | H04N 19/105 375/240.12 |
| 2010/0272183 A1* | 10/2010 | Kamp | ................. | H04N 19/105 375/240.16 |
| 2010/0316125 A1* | 12/2010 | Chappalli | ............ | H04N 19/132 375/240.16 |
| 2011/0002388 A1* | 1/2011 | Karczewicz | ........... | H04N 19/51 375/240.15 |
| 2012/0177125 A1* | 7/2012 | Sugio | .................... | H04N 19/52 375/240.16 |

\* cited by examiner

P FRAME-BASED MULTI-HYPOTHESIS MOTION COMPENSATION METHOD

CROSS-REFERENCE TO RELAYED APPLICATIONS

This application is a continuation-in-part of International Patent Application No. PCT/CN2013/080172 with an international filing date of Jul. 26, 2013, designating the United States, now pending. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The invention relates to the technical field of video encoding, in particular to a P frame-based multi-hypothesis motion compensation method.

Description of the Related Art

At present, most mainstream video encoding standards, such as AVS, H.264 and HEVC, employ a hybrid encoding frame. Since techniques of motion estimation and motion compensation have been employed comprehensively, the correlation of time domain between video frames has been employed well and the video compression efficiency has been improved.

In the traditional P frame motion compensation method, the prediction block is only relevant to a single motion vector obtained by motion estimation so the accuracy of the obtained prediction block is not very high. As for a B frame bidirectional motion compensation method, after motion estimation, it obtains forward and backward motion vectors and obtains two prediction blocks correspondingly. The final prediction block is obtained by performing weighted averaging on the two prediction blocks. Therefore, the obtained prediction block is more accurate. However, since two motion vectors need to be introduced into the code rate, the code rate increases.

SUMMARY OF THE INVENTION

The invention provides a multi-hypothesis motion compensation method which can improve the accuracy of P frame motion compensation prediction blocks on the premise that the code rate isn't increased.

The P frame-based multi-hypothesis motion compensation method comprises:
- taking an encoded image block adjacent to a current image block as a reference image block and obtaining a first motion vector of the current image block by using a motion vector of the reference image block, the first motion vector pointing to a first prediction block;
- taking the first motion vector as a reference value and performing joint motion estimation on the current image block to obtain a second motion vector of the current image block, the second motion vector pointing to a second prediction block; and
- performing weighted averaging on the first prediction block and the second prediction block to obtain a final prediction block of the current image block.

In an embodiment, it takes an encoded image block adjacent to a current image block as a reference image block, which is to take three image blocks in an encoded image block adjacent to a current image block as a reference image block.

It further obtains a first motion vector of the current image block by using a motion vector of the reference image block as follows:
- if only one reference image block is estimated to have a motion vector among the three reference image blocks, the motion vector is taken as a first motion vector of the current image block; otherwise, the following steps continue to be performed:
- if, among the three reference image blocks, the horizontal component of the motion vector of one reference image block and the horizontal components of the motion vectors of the other two reference image blocks are estimated to be in opposite directions, it takes the mean of the horizontal components of the motion vectors of the other two reference image blocks as a horizontal component of a first motion vector of the current image block; if, among the three reference image blocks, the vertical component of the motion vector of one reference image block and the vertical components of the motion vectors of the other two reference image blocks are estimated to be in opposite directions, it takes the mean of the vertical components of the motion vectors of the other two reference image blocks as a vertical component of a first motion vector of the current image block; otherwise, the following steps continue to be performed:
- it calculates the horizontal distance between any two reference image blocks, and takes the mean of the horizontal components of the motion vectors of the two reference image blocks with the shortest distance as a horizontal component of a first motion vector of the current image block; it calculates the vertical distance between any two reference image blocks, and takes the mean of the vertical components of the motion vectors of the two reference image blocks with the shortest distance as a vertical component of a first motion vector of the current image block.

In an embodiment, when it performs weighted averaging on the first prediction block and the second prediction block to obtain the final prediction block of the current image block, the weighted sum of the first prediction block and the second prediction block is 1. Specifically, both weights of the first prediction block and the second prediction block are ½.

In an embodiment, after obtaining the final prediction block of the current image block, it also adds the residual information of the current image block and the final prediction block and the second motion vector into the encoding code rate of the current image block.

The invention provides a P frame-based multi-hypothesis motion compensation method. According to the method, the final prediction block of the current image block to be encoded is relevant to not only the motion vector obtained by motion estimation, but also the motion vector of the encoded image block adjacent to the current image block; the final prediction block is determined by the first motion vector and the second motion vector; the first motion vector is determined by the motion vector of the encoded image block adjacent to the current image block; the second motion vector takes the first motion vector as a reference value and is obtained by joint motion estimation; the final prediction block is obtained by performing weighted averaging on the first prediction block and the second prediction block which are pointed to by the first motion vector and the second motion vector respectively. The use of the method enables the accuracy of the prediction block of the current image block to be encoded to be higher, and moreover, the code rate will not be increased.

BRIEF DESCRIPTION OF THE DRAWINGS

The invention is described hereinbelow with reference to the accompanying drawings, in which.

DETAILED DESCRIPTION OF THE EMBODIMENTS

Embodiments of the invention provide a P frame-based multi-hypothesis motion compensation method which is used in the technical field of video encoding. The inventive concept of the invention puts forward a P frame-based multi-hypothesis motion compensation method by taking both advantages and disadvantages of B frame and P frame motion compensation methods into account. The method takes advantage of not only the correlation of time domain between video frames but also the correlation of space domain between video frames to make predication blocks more accurate. However, it only needs to introduce a motion vector to the code rate without increasing the code rate.

Usually, every frame image is divided into macroblocks in video encoding. Every macroblock has a fixed size. Every image block of a frame image is processed from the first image block on the upper-left side in a sequence from left to right, from top to bottom. Please refer to FIG. 1. For example, a frame image is divided into 16×16 pixel macroblocks (image blocks); every macroblock has a fixed size of 16×16 pixels; and the image-processing sequence is to process the first line of image blocks from left to right and then process the second line of image blocks until the processing of the whole frame image is completed.

Figure 1:
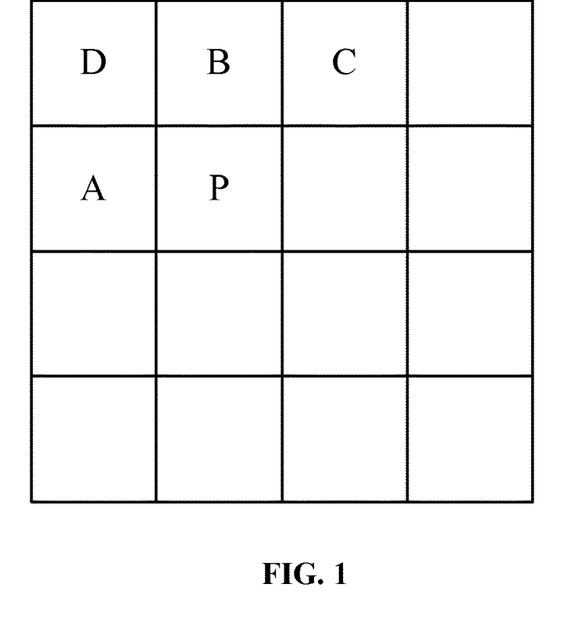
FIG. 1 is a diagram of a reference image block in accordance with one embodiment of the invention.

If the image block P is the current image block, in some embodiments, it calculates the first motion vector of the current image block by taking the motion vector of the reference image block as a reference value while making motion compensation to the current image block P. Since every image block of a frame image is highly similar to the encoded image blocks adjacent to it, generally, the reference image blocks adopt encoded image blocks adjacent to the current image block. As shown in FIG. 1, the reference image blocks of the current image block P are A, B, C and D.

In some embodiments, the upper, upper-right and left image blocks adjacent to the current image block can also be chosen as reference image blocks in choosing reference image blocks. For example, as shown in FIG. 1, the reference image blocks of the current image block P are A, B and C. If the upper-right image block of the current image block doesn't exist (the current image block is in the first line on the right) or the image block C doesn't have a motion vector, the upper-left image block of the current image block is used as an alternative. For example, as shown in FIG. 1, A, B and D are chosen as the reference image blocks of the current image block P.

In some embodiments, the image blocks may be further divided into sub-image blocks while the image blocks are encoded. For example, the 16×16 pixel image blocks are further divided into 4×4 pixel sub-image blocks. Please refer to FIG. 2.

Figure 2:
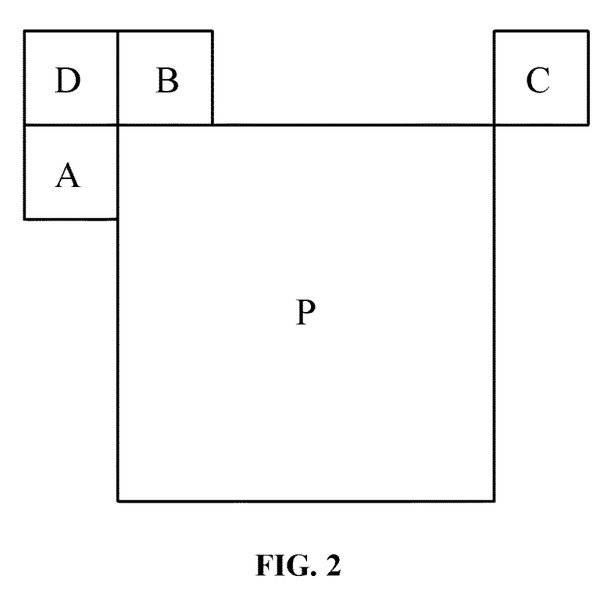
FIG. 2 is a diagram of a reference image block in accordance with another embodiment of the invention.

In the embodiment, when the first motion vector of the current image block is obtained, the invention is explained by an example which takes encoded sub-image blocks adjacent to the current image block as reference image blocks. In order to make it easy to understand the invention, in the embodiment, the encoded sub-image blocks adjacent to the current image block are collectively called the encoded image blocks adjacent to the current image block; as shown in FIG. 2, A, B and C are chosen as the encoded image blocks adjacent to the current image block P; and D will replace C as an encoded image block adjacent to the current image block P when C doesn't have a motion vector.

Figure 3:
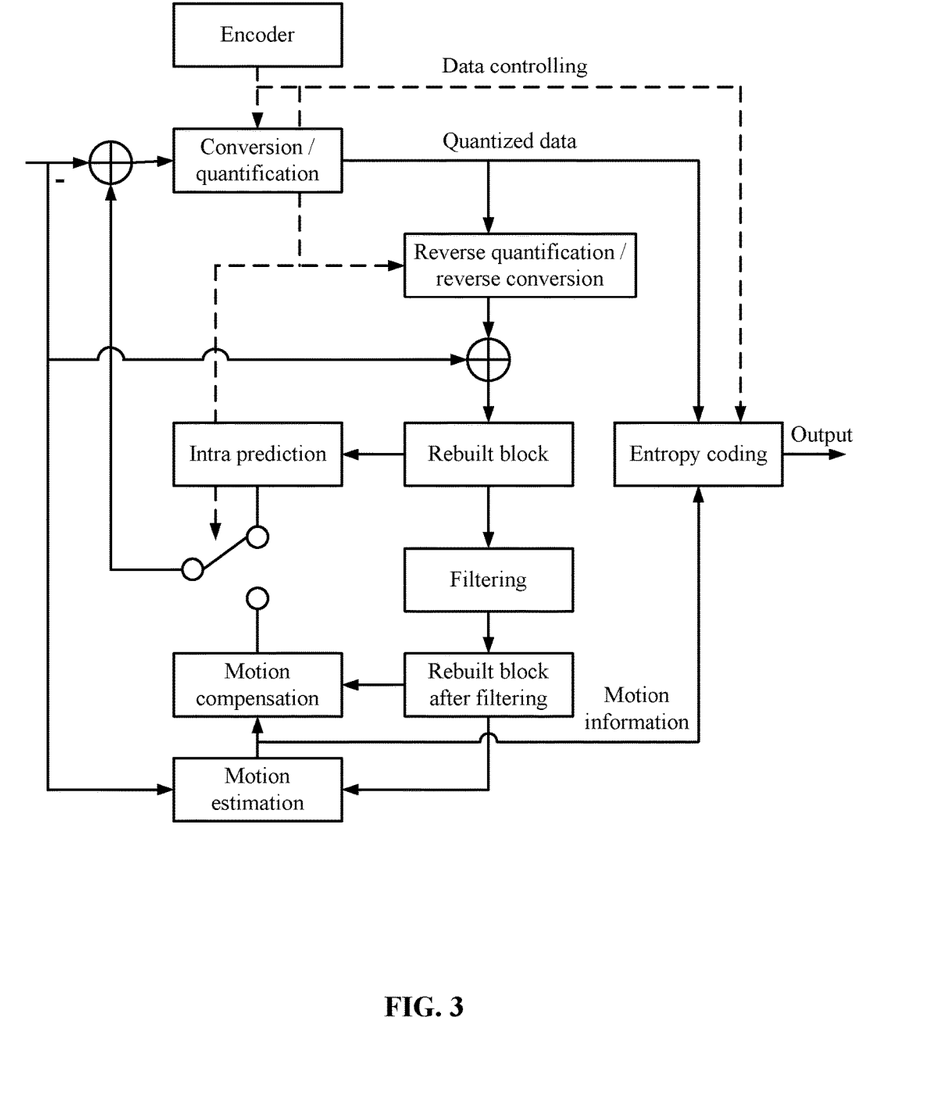
FIG. 3 is an encoding block diagram adopted by current mainstream video encoding standards.

Please refer to FIG. 3. FIG. 3 is an encoding block diagram adopted by current mainstream video encoding standards. An input frame image is divided into a plurality of macroblocks (image blocks), and intra-frame prediction (intra-frame encoding) or motion compensation (inter-frame encoding) are made on the current image block. An encoding mode with a minimum encoding cost is chosen by selector so as to obtain the prediction block of the current image block. The current image block minus the prediction block is the residual. A code rate sequence is formed and outputted by conversion, quantization, scanning and entropy encoding of the residual.

The invention puts forward improvements in motion estimation and motion compensation. In terms of motion estimation, the derivation of the first motion vector MVL 1 takes advantage of the motion vector information of the encoded image blocks adjacent to the current image block; the second motion vector MVL 2 is searched and obtained by referring to the joint motion estimation mode of the MVL 1. In terms of motion compensation, the final prediction block is obtained by performing weighted averaging on the first prediction block and the second prediction block pointed by the MVL 1 and the MVL 2 respectively. In the embodiment, only a motion vector (MVL 2) and the residual information of the current image block and the final prediction block need to be transmitted in performing entropy encoding.

Figure 4:
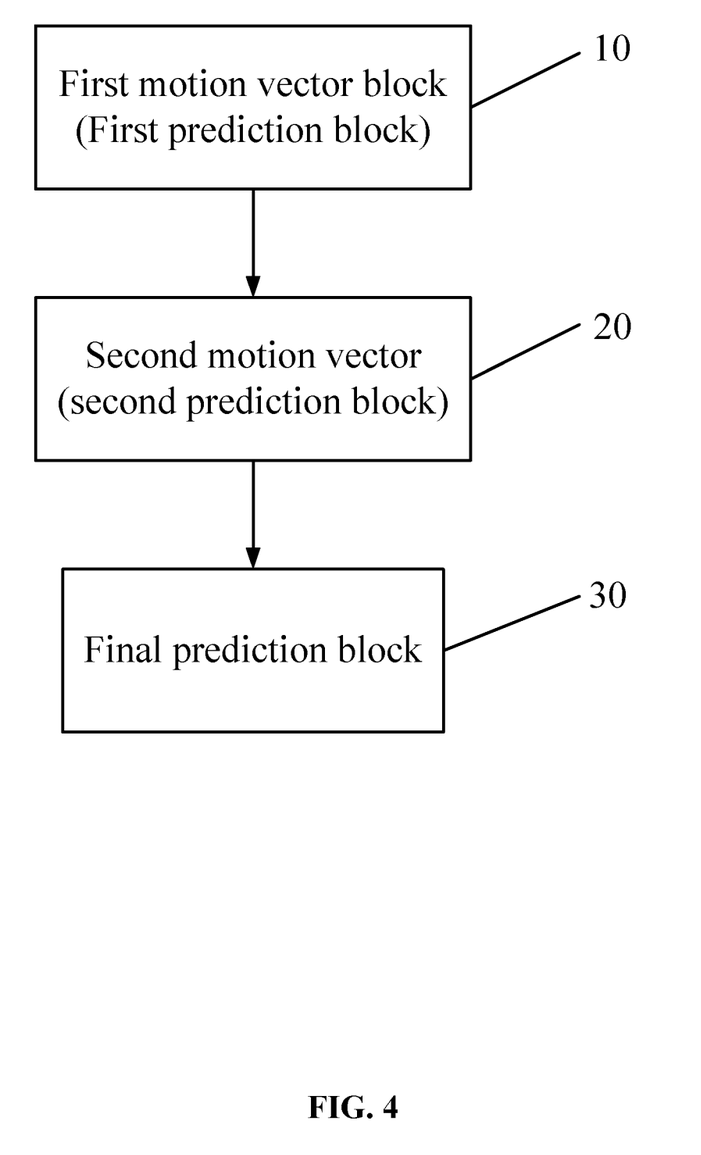
FIG. 4 is a flow diagram of a P frame-based multi-hypothesis motion compensation method in accordance with an embodiment of the invention.

Please refer to FIG. 4, the embodiment provides a P frame-based multi-hypothesis motion compensation method, which comprises:

Step 10: taking an encoded image block adjacent to a current image block as a reference image block and obtaining a first motion vector MVL 1 of the current image block by using a motion vector of the reference image block, the first motion vector MVL 1 pointing to a first prediction block PL 1.

Step 20: taking the first motion vector MVL 1 as a reference value and performing joint motion estimation on the current image block to obtain a second motion vector MVL 2 of the current image block, the second motion vector MVL 2 pointing to a second prediction block PL 2.

Step 30: performing weighted averaging on the first prediction block PL 1 and the second prediction block PL 2 to obtain a final prediction block PL of the current image block.

In the Step 10, since the reference image blocks in the embodiment choose the mode as shown in FIG. 2, three image blocks of the encoded image block adjacent to the current image block are chosen as the reference image blocks for explanation, when encoded image blocks adjacent to the current image block are chosen as reference image blocks. That is, A, B and C as shown in FIG. 2 are the reference image blocks of the current image block. When C doesn't have a motion vector, D is chosen to replace C as a reference image block of the current image block. In other embodiments, in order to obtain a first motion vector relevant to image blocks adjacent to the current image block, other encoded image blocks adjacent to the current image block can be chosen as reference image blocks.

In the embodiment, the obtaining of the first motion vector MVL 1 is in relation to the encoded image blocks A, B, C and D (reference image blocks) adjacent to the current image block. The formula for obtaining the first motion vector is shown as the Formula (1):

$$MVL1=f(MVA,MVB,MVC,MVD) \quad (1),$$

in which, MVA, MVB, MVC and MVD represent motion vectors of the four reference image blocks and f is a function concerning the four motion vectors.

Figure 5:
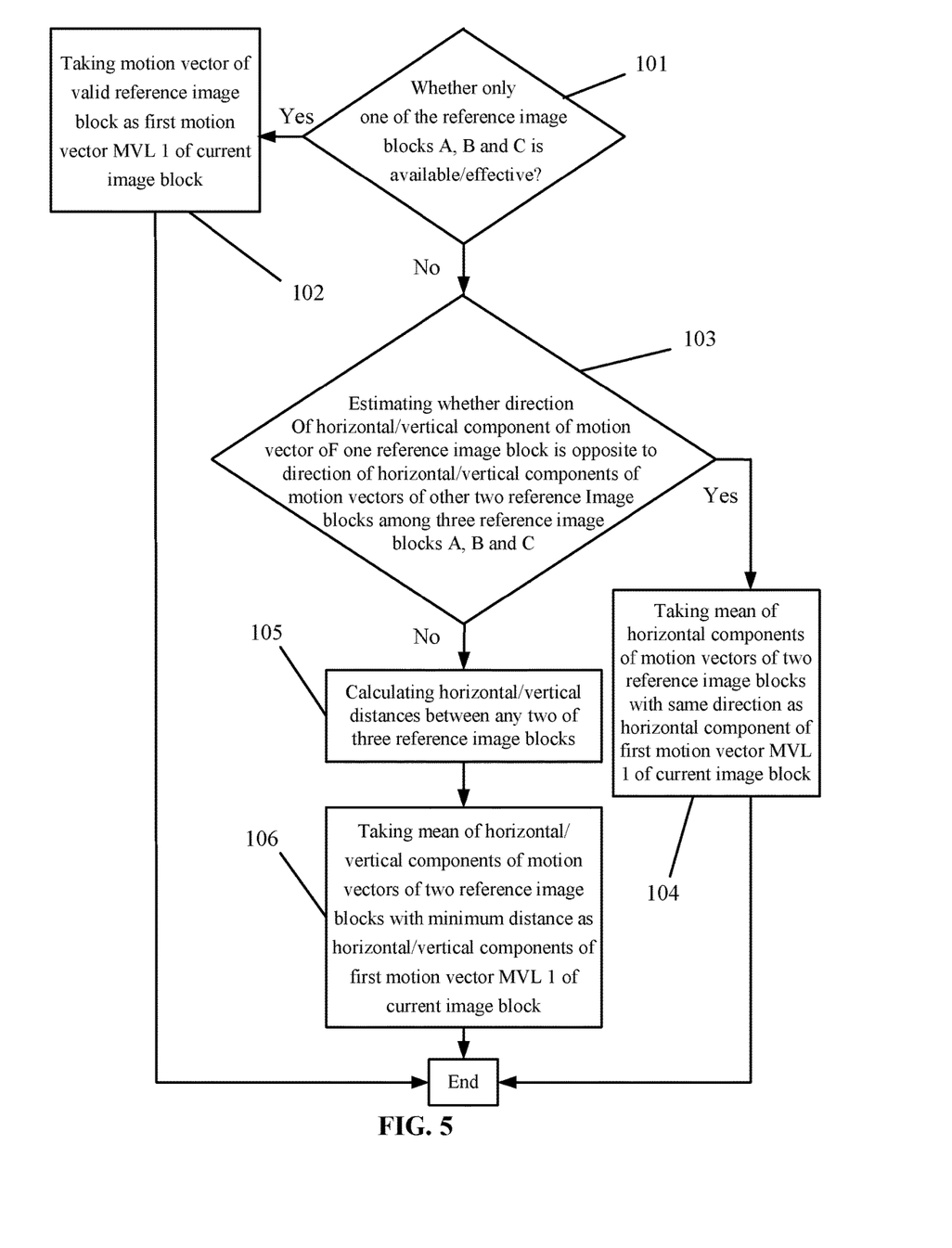
FIG. 5 is a flow diagram of a first motion vector derivation method in accordance with an embodiment of the invention.

Please refer to FIG. 5. In the Step 10, when the first motion vector MVL 1 of the current image block is obtained by the motion vectors of the reference image blocks, the Step 10 comprises the following steps:

Step 101: estimating whether there is only one reference image block having a motion vector among the three reference image blocks A, B and C. If there is a motion vector, the reference image block is valid and it goes to the Step 102. If there isn't a motion vector, the reference image block is invalid and it goes to the Step 103. When the reference image block C is invalid, the reference image block D is chosen to replace the reference image block C.

Step 102: taking the motion vector of the valid reference image block as the first motion vector MVL 1 of the current image block.

Step 103: estimating whether the direction of the horizontal/vertical component of the motion vector of one reference image block is opposite to the direction of the horizontal/vertical components of the motion vectors of the other two reference image blocks among the three reference image blocks A, B and C. If they are opposite, it goes to the Step 104. Otherwise, it goes to the Step 105.

Step 104: taking the mean of the horizontal components of the motion vectors of two reference image blocks with the same direction as the horizontal component of the first motion vector MVL 1 of the current image block.

The Steps 103 and 104 can be represented as follows. The horizontal components of the reference image blocks A, B and C are recorded as MVAx, MVBx and MVCx. The vertical components of the reference image blocks A, B and C are recorded as MVAy, MVBy and MVCy. The horizontal and vertical components of the first motion vector MVL 1 are recorded as MVL1x and MVL1y. Then:

if MVAx<0, MVBx>0 and MVCx>0, or MVAx>0, MVBx<0 and MVCx<0, MVL1x=(MVBx+MVCx)/2;

if MVBx<0, MVAx>0 and MVCx>0, or MVBx>0, MVAx<0 and MVCx<0, MVL1x=(MVAx+MVCx)/2;

if MVCx<0, MVAx>0 and MVBx>0, or MVCx>0, MVAx<0 and MVBx<0, MVL1x=(MVAx+MVBx)/2;

if MVAy<0, MVBy>0 and MVCy>0, or MVAy>0, MVBy<0 and MVCy<0, MVL1y=(MVBy+MVCy)/2;

if MVBy<0, MVAy>0 and MVCy>0, or MVBy>0, MVAy<0 and MVCy<0, MVL1y=(MVAy+MVCy)/2; and if MVCy<0, MVAy>0 and MVBy>0, or MVCy>0, MVAy<0 and MVBy<0, MVL1y=(MVAy+MVBy)/2.

Step 105: calculating the horizontal/vertical distances between any two of the three reference image blocks. The distances are represented as follows. The horizontal/vertical distances between A and B, between B and C, and between A and C are respectively recorded as ABSVABx, ABSVBCx and ABSVCAx/ABSVABy, ABSVBCy and ABSVCAy, that is:

$$ABSVABx=|MVAx-MVBx|, ABSVBCx=|MVBx-MVCx|,$$

$$ABSVCAx=|MVCx-MVAx|, ABSVABy=|MVAy-MVBy|,$$

$$ABSVBCy=|MVBy-MVCy|, ABSVCAy=|MVCy-MVAy|.$$

Step 106: taking the mean of the horizontal/vertical components of the motion vectors of two reference image blocks with a minimum distance as the horizontal/vertical components of the first motion vector MVL 1 of the current image block, that is:

if ABSVABx<ABSVBCx and ABSVABx<ABSVCAx, MVL1x=(MVAx+MVBx)/2;

if ABSVBCx<ABSVABx and ABSVBCx<ABSVCAx, MVL1x=(MVBx+MVCx)/2;

if ABSVCAx<ABSVABx and ABSVCAx<ABSVBCx, MVL1x=(MVAx+MVCx)/2;

if ABSVABy<ABSVBCy and ABSVABy<ABSVCAy, MVL1y=(MVAy+MVBy)/2;

if ABSVBCy<ABSVABy and ABSVBCy<ABSVCAy, MVL1y=(MVBy+MVCy)/2; and if ABSVCAy<ABSVABy and ABSVCAy<ABSVBCy, MVL1y=(MVAy+MVCy)/2.

The second motion vector MVL 2 takes the first motion vector MVL 1 as a reference value and is derived by joint motion estimation. The specific derivation formula is shown as the Formula (2):

$$MVL2=f(MVL1) \quad (2),$$

in which, f is a function concerning the first motion vector MVL 1 for joint motion estimation.

In the embodiment, the estimation process of the joint motion estimation used by the second motion vector MVL 2 is the same as the regular motion estimation process (for example, the regular B frame motion estimation process). Therefore, it is unnecessary to go into details. Since the first motion vector MVL 1 is consulted when the second motion vector MVL 2 is derived by joint motion estimation, the motion vector with a minimum Lagrange cost function shown in the Formula (3) within the search range is the second motion vector MVL 2 when the Lagrange cost functions are evaluated:

$$J(\lambda sad, MVL2)=Dsad(S, MVL2, MVL1)+\lambda sad*R(MVL2-MVL2pred) \quad (3),$$

in which MVL 2pred represents the prediction value of MVL 2, R (MVL 2−MVL 2pred) represents the number of bits of the encoded motion vector residual, λsad represents a weight coefficient of R (MVL 2−MVL 2pred), and Dsad (S, MVL 2, MVL 1) represents a residual of the current image block S and the prediction block which can be obtained by the Formula (4) as follows:

$$Dsad(S, MVL2, MVL1) = \quad (4)$$

$$\sum_{0=3} |S(x, y) - (Sref(x + MVL2x, y + MVL2y) +$$

$$Sref(x + MVL1x, y + MVL1y)) >> 1|,$$

in which, x, y represents the corresponding coordinate position of a pixel of the current image block S in the current encoding frame; MVL1x and MVL1y/MVL 2x and MVL 2y separately represent the horizontal and vertical components of MVL 1 and MVL 2; and Sref represents a reference frame.

Figure 6:
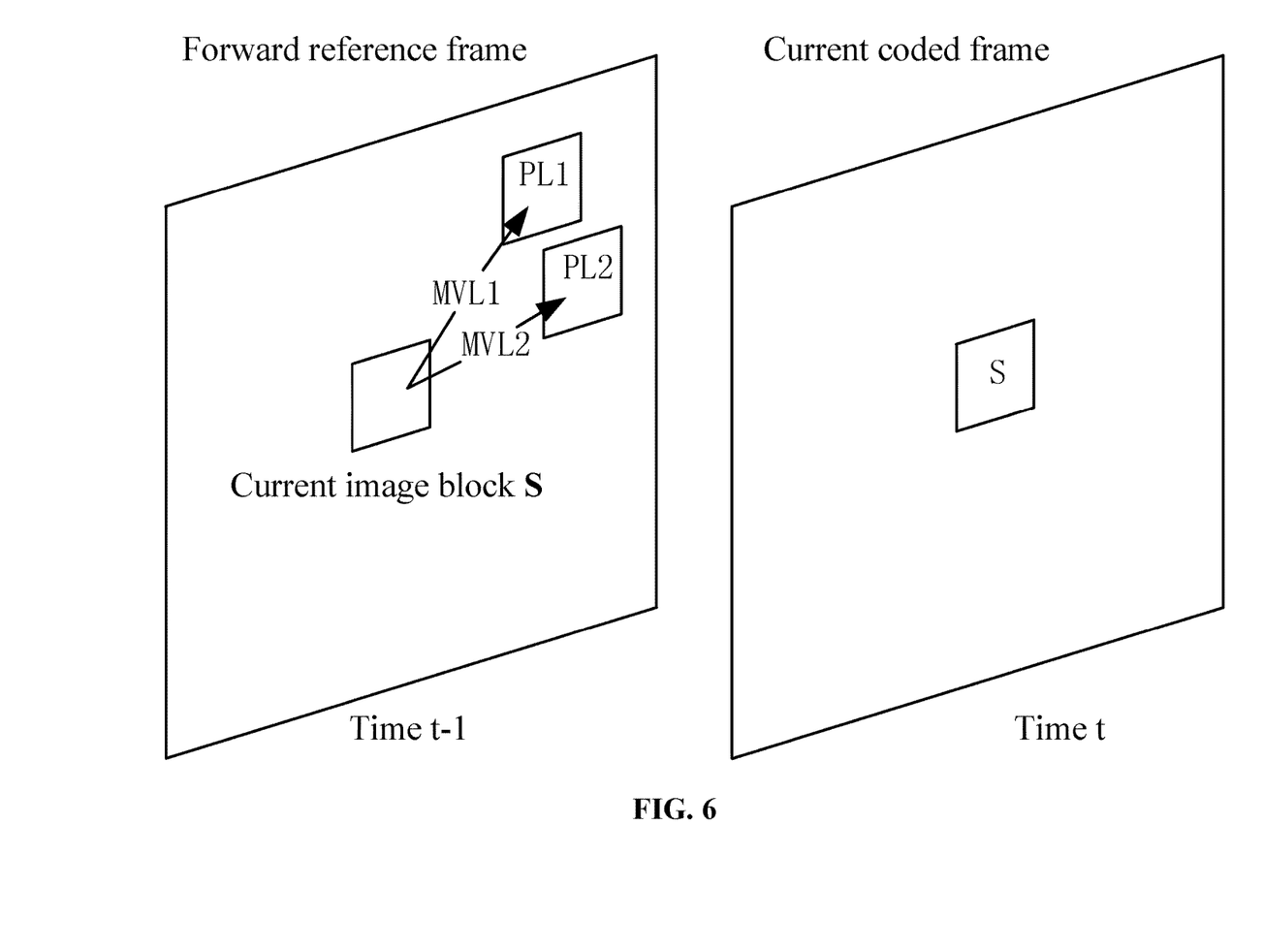
FIG. 6 is a diagram of obtaining a prediction block of the current image block in accordance with an embodiment of the invention.

Please refer to FIG. 6. FIG. 6 is a diagram of obtaining a prediction block of the current image block in accordance with the embodiment in which the frame image with the time of t−1 is regarded as a forward reference frame and the frame image with the time oft is regarded as a current encoding frame. The Step 30 performs weighted averaging on the first prediction block PL 1 and the second prediction block PL 2 to obtain the final prediction block PL of the current image block S, that is, PL=aPL1+bPL2, in which a and b are weight coefficients and a+b=1. In the embodiment, a=b=½, that is, the weight of the first prediction block PL 1 and the weight of the second prediction block PL 2 are both ½.

In the embodiment, after the final prediction block of the current image block is obtained, the method also comprises: adding the residual information of the current image block and the final prediction block and the second motion vector MVL 2 into the encoding code rate of the current image block. Since the code rate only comprises one motion vector MVL 2, the embodiment provides a P frame-based multi-hypothesis motion compensation method which can improve the accuracy of P frame prediction blocks on the premise that the code rate isn't increased.

Figure 7:
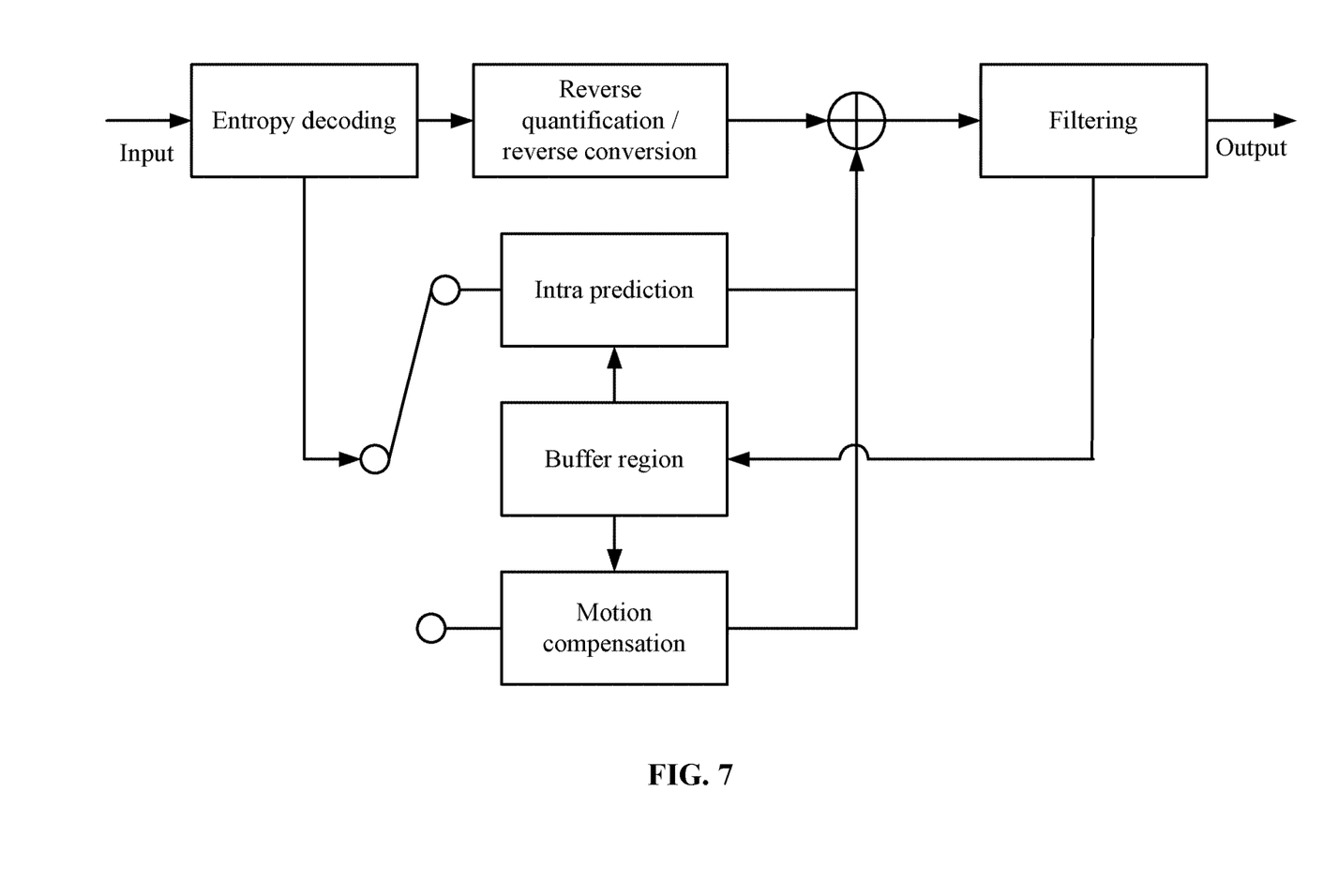
FIG. 7 is a decoding block diagram corresponding to a P frame-based multi-hypothesis motion compensation method in accordance with an embodiment of the invention.

Please refer to FIG. 7 which is a decoding block diagram adopted by the embodiment. At the decoding end, after input of the code rate, entropy decoding, inverse quantization and inverse transformation, a selector is used to choose intra-frame encoding or inter-frame encoding. The inter-frame encoding obtains the prediction block of the current image block by decoding information and consulting reconstruction frames in a buffer, and adds the prediction block and the residual block to get the reconstruction block. As for the invention, the value of MVL 1 can be determined by derivation. Refer to the derivation process of MVL 1 at the encoding end for a specific derivation process. The value of MVL 2 is obtained by entropy decoding. MVL 1 and MVL 2 separately point to the corresponding prediction blocks PL 1 and PL 2 in the reference reconstruction frame. The final predication block PL is the weight average of PL 1 and PL 2.

In a specific encoding process, the multi-hypothesis motion compensation method set forth in the embodiments of the invention can be independently used to encode P frames and can also be added into the mode of encoding P frames as a new encoding mode. Through a decision-making process on modes, finally, an encoding mode with a minimum encoding cost is chosen to encode P frames.

Those skilled in the art can understand that all or part of the steps in the embodiments can be completed by using a program to command relevant hardware. The program can be stored in a readable memory medium of a computer. The memory medium may be read-only memories, random access memories, disks or optical disks.

The above content further explains the invention in detail with embodiments. The embodiments of the invention are not limited to these explanations. On the premise of adhering to the inventive concept of the invention, those skilled in the art can also make a plurality of simple deductions and replacements.

The invention claimed is:

1. A P frame-based multi-hypothesis motion compensation method, comprising:
   taking an encoded image block adjacent to a current image block as a reference image block and obtaining a first motion vector of the current image block by using a motion vector of the reference image block, the first motion vector pointing to a first prediction block;
   taking the first motion vector as a reference value and performing joint motion estimation on the current image block to obtain a second motion vector of the current image block, the second motion vector pointing to a second prediction block; and
   performing weighted averaging on the first prediction block and the second prediction block to obtain a final prediction block of the current image block;
   wherein:
   three image blocks of the encoded image block adjacent to the current image block are taken as reference image blocks; and
   the first motion vector of the current image block is obtained by using a motion vector of the reference image block as follows:
      if only one reference image block is estimated to have a motion vector among the three reference image blocks, the motion vector is taken as a first motion vector of the current image block;
      otherwise, the following steps continue to be performed:
      if, among the three reference image blocks, the horizontal component of the motion vector of one reference image block and the horizontal components of the motion vectors of the other two reference image blocks are estimated to be in opposite directions, it takes the mean of the horizontal components of the motion vectors of the other two reference image blocks as a horizontal component of a first motion vector of the current image block; if, among the three reference image blocks, the vertical component of the motion vector of one reference image block and the vertical components of the motion vectors of the other two reference image blocks are estimated to be in opposite directions, it takes the mean of the vertical components of the motion vectors of the other two reference image blocks as a vertical component of a first motion vector of the current image block;
      otherwise, the following steps continue to be performed:
      it calculates the horizontal distance between any two reference image blocks, and takes the mean of the horizontal components of the motion vectors of the two reference image blocks with the shortest distance as a horizontal component of a first motion vector of the current image block; it calculates the vertical distance between any two reference image blocks, and takes the mean of the vertical components of the motion vectors of the two reference image blocks with the shortest distance as a vertical component of a first motion vector of the current image block.

2. The method of claim 1, wherein the weighted sum of the first prediction block and the second prediction block is 1 when the final prediction block of the current image block is obtained by performing weighted averaging on the first prediction block and the second prediction block.

3. The method of claim 2, wherein both weights of the first prediction block and the second prediction block are ½.

4. The method of claim 1, wherein after the final prediction block of the current image block is obtained, it also adds the residual information of the current image block and the final prediction block and the second motion vector into the encoding code rate of the current image block.

\* \* \* \* \*